(12) United States Patent
Schumacher

(10) Patent No.: US 12,501,259 B1
(45) Date of Patent: Dec. 16, 2025

(54) PUBLIC WARNING SERVICE FOR PUBLIC AND NON-PUBLIC NETWORKS

(71) Applicant: T-Mobile USA, Inc., Bellevue, WA (US)

(72) Inventor: Gregory David Schumacher, Holliston, MA (US)

(73) Assignee: T-Mobile USA, Inc., Bellevue, WA (US)

( * ) Notice: Subject to any disclaimer, the term of this patent is extended or adjusted under 35 U.S.C. 154(b) by 33 days.

(21) Appl. No.: 17/463,444

(22) Filed: Aug. 31, 2021

(51) Int. Cl.
| | |
|---|---|
| *H04W 12/03* | (2021.01) |
| *H04W 4/90* | (2018.01) |
| *H04W 12/041* | (2021.01) |
| *H04W 12/0431* | (2021.01) |

(52) U.S. Cl.
CPC ............. *H04W 12/03* (2021.01); *H04W 4/90* (2018.02); *H04W 12/041* (2021.01); *H04W 12/0431* (2021.01)

(58) Field of Classification Search
CPC ... H04W 12/03; H04W 4/90; H04W 12/0431; H04W 12/041
See application file for complete search history.

(56) References Cited

U.S. PATENT DOCUMENTS

| | | | | |
|---|---|---|---|---|
| 2013/0246798 | A1* | 9/2013 | Buckley | H04L 63/12 713/176 |
| 2015/0004925 | A1* | 1/2015 | Suh | H04W 12/10 455/404.1 |
| 2021/0111902 | A1* | 4/2021 | Lee | H04L 9/3247 |
| 2022/0038411 | A1* | 2/2022 | Schuler | H04L 51/214 |
| 2022/0046403 | A1* | 2/2022 | He | H04W 4/90 |
| 2022/0086644 | A1* | 3/2022 | Johansson | H04W 12/122 |
| 2024/0031799 | A1* | 1/2024 | Salmela | H04L 9/3073 |

* cited by examiner

*Primary Examiner* — Kevin Bechtel
*Assistant Examiner* — Forrest L Carey
(74) *Attorney, Agent, or Firm* — Lee & Hayes, P.C.

(57) ABSTRACT

Systems and methods discussed herein are directed to handling the transmission of emergency alert messages, such as wireless emergency alert (WEA) messages, using a Public Key Infrastructure (PKI) made available to public networks and non-public networks (NPNs) as well as the computing devices (e.g., terminals, user equipment (UE), etc.) operating on the public networks and/or NPNS. The emergency alert messages may be transmitted and/or presented using cryptographic signatures generated by private key and/or public keys associated with the PKI.

15 Claims, 7 Drawing Sheets

PUBLIC WARNING SERVICE FOR PUBLIC AND NON-PUBLIC NETWORKS

BACKGROUND

Current public warning systems are designed on the assumption that only authorized governmental, federal, state, local, and/or tribal public safety agencies are allowed to generate wireless emergency alert (WEA) messages for distribution to the public by licensed wireless operators. However, malicious actors may utilize false base station (e.g., rogue base stations) broadcasting false or fake WEA messages to trigger mass panic, such as in a sports stadium during a sporting event. Additionally, the Federal Communication Commission (FCC) does not currently regulate how and/or when non-public networks (NPNs) should broadcast WEA messages or alerts applicable only to the NPN. Thus, there is a need for a secure and reliable way to broadcast WEA messages via public networks and NPNs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
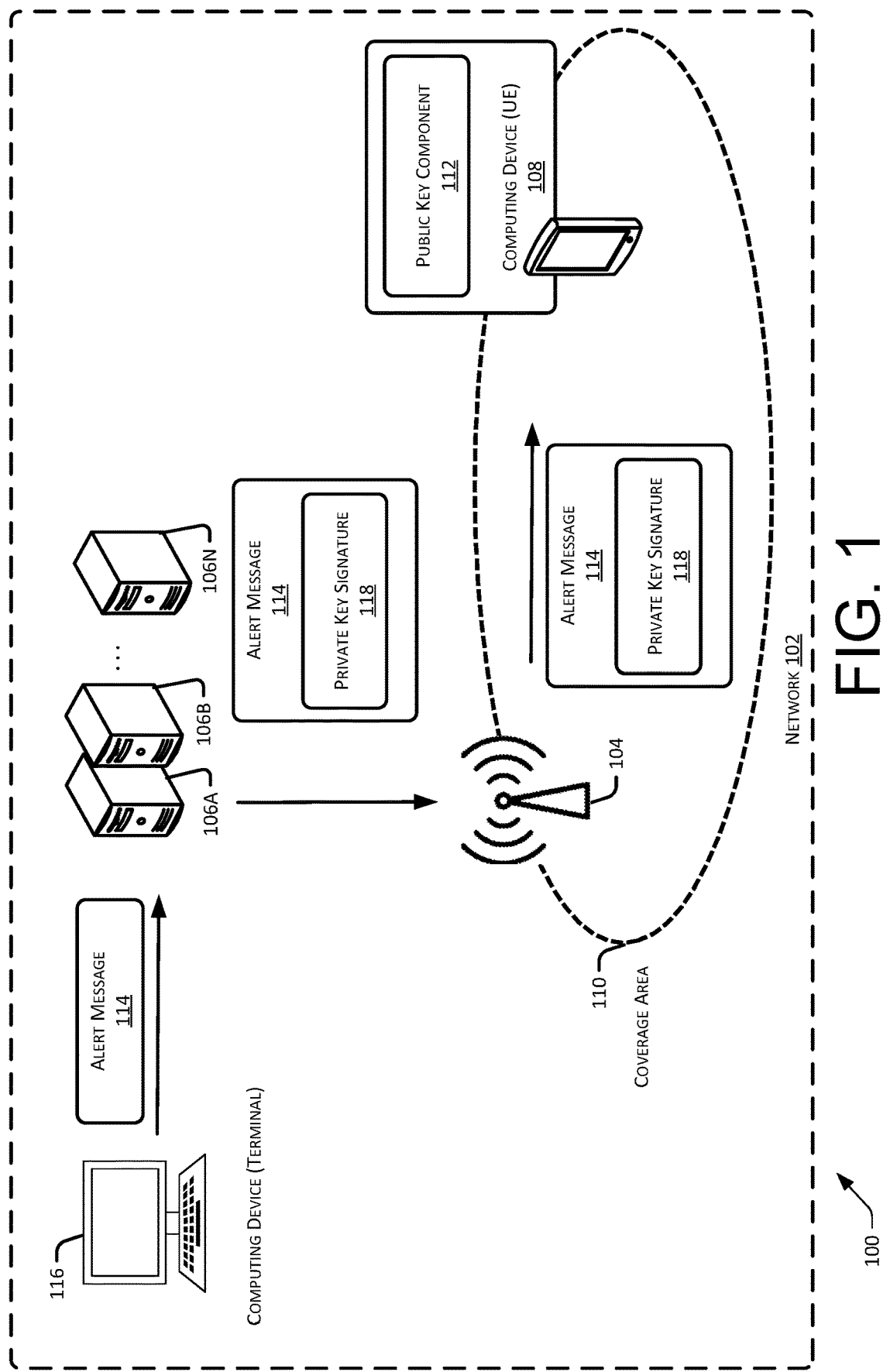
FIG. 1 is a pictorial diagram of a portion of an example wireless communication network configured to transmit alert messages, in accordance with various configurations.

Systems and methods discussed herein are directed to handling the transmission of emergency alert messages, such as WEA messages, using a Public Key Infrastructure (PKI) made available to public networks and non-public networks (NPNs) as well as the computing devices (e.g., terminals, user equipment (UE), etc.) operating on the public networks and/or NPNs.

For example, in configurations, a network provider (e.g., telecommunication network provider) may provide usage of a 5G network in the form of a NPN (e.g., private network and/or unlicensed network) covering a small geographic area, such as a factory, refinery, a university, enterprise campus, a stadium, and/or any area providing services for customers, employees, and/or students. In some examples, the network provider may be providing 5G network capabilities through unlicensed spectrum in a hosted fashion.

In some cases, the network provider and/or another network provider, may provide a public network, such as a wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VOIP, VOLTE, IEEE 802.1x protocols, wireless microwave access (WIMAX), WIFI, and/or any future IP-based network technology or evolution of an existing IP-based network technology.

In some examples, the network provider may utilize a PKI and provide a public key to a UE that is desired to receive alert messages (e.g., emergency alert messages, WEA messages, etc.) while the UE is connected to the public network and/or NPN. For example, the network provider may generate a first public key having a first public key signature that is associated with a public network and provide the UE with the first public key. The network provider may generate a corresponding first private key having a first private key signature that corresponds with the first public key such that, when a signed message is transmitted with the first private key signature, the first public key signature may validate the message.

In some examples, the network provider may utilize the PKI to generate a second public key having a second public key signature that is associated with a NPN covering a geographic area (e.g., providing network services to a factory, refinery, a university, enterprise campus, a stadium, etc.) and provide a UE that is desired to receive messages from a public safety entity within the geographic area with the second public key. The network provider may generate a corresponding second private key having a second private key signature that corresponds with the second public key such that, when a signed message is transmitted with the second private key signature, the second public key signature may validate the message. In some case, the first public key and/or the second public key may be sent to the UE(s) via an over-the-air (OTA) update.

In some examples, the network provider may receive an alert message to be broadcast over a geographic area. For example, the alert message may be received from a terminal associated with a public safety entity (e.g., governmental, federal, state, local, and/or tribal public safety agencies) and may include parameters, such as an alert level (e.g., low, medium, high, etc.), a nature of the alert (e.g., Amber alert, fire alert, weather alert, active shooter alert, etc.), a geographic area associated with the alert (e.g., street address, geographic address, distance within an address, etc.), a start time associated with the alert (e.g., time, date, etc.), and/or an end time associated with the alert (e.g., time, date, etc.). In some examples, the alert message and/or the public safety entity may be operating on, and/or otherwise associated with, a public network and/or a NPN provided by the network provider.

In some cases, the network provider may generate a cryptographic signature on the alert message using the first private key and/or the second private key. For example, the network provider may determine that the alert message and/or the public safety entity may be operating on, and/or otherwise associated with, the public network and may generate the first private key signature on the alert message. In some cases, the network provider may determine that the alert message and/or the public safety entity may be operating on, and/or otherwise associated with, the NPN and may generate the second private key signature on the alert message. In some examples, the network provider may determine that the alert message and/or the public safety entity may be operating on, and/or otherwise associated with, the public network and may generate the second private key signature on the alert message. In this case, the network provider may determine that the alert message is associated with a NPN even though the alert message was not generated on the NPN. For example, the NPN may provide network access to a smaller geographic location located within a larger geographic location that is covered by the public network. The network provider of the NPN may receive alert messages from the public network and may generate either the second private key signature using the second private key associated with the NPN or the first private key signature using the first private key associated with the public network in cases where the network provider of the NPN also securely stores and/or otherwise has access to the first private key.

In some cases, once the network provider receives an alert message and generates a cryptographic signature, the network provider may broadcast the alert message and the cryptographic signature to UEs in the designated geographic area. For example, the network provider may store a list of cell sites and their geographic location. The network provider may broadcast the alert message and the cryptographic signature to the cell sites and/or directly to the UEs that are within the geographic area designated in the alert message.

In some cases, the UE may receive the first public key and/or the second public key via an OTA update and/or the UE may securely store the first public key and/or the second public key in a SIM of the UE. In some cases, the first public key and/or the second public key are received by the UE once the UE has entered a geographic location that is receiving network services from the public network associated with the first public key and/or the NPN associated with the second public key. In some cases, the first public key and/or the second public key are provided to the UE during a manufacturing phase of the UE (e.g., via an original equipment manufacturer (OEM).

In some examples, the UE may receive the alert message broadcast from the network provider and/or a cell site of the network provider including the cryptographic signature. For example, in some cases, the UE may be monitoring a system information block (SIB) channel of the network provider and/or the cell site and may receive the alert message and the cryptographic signature via the SIB channel.

In some cases, the UE may generate a first public key signature and/or a second public key signature and compare the first public key signature and/or the second public key signature to the received message. For example, the UE may securely store multiple public keys associated with respective networks (e.g., public networks and/or NPNs) that the UE is connected to or within a geographic area receiving service from the networks. In some examples, when the UE receives an alert message having a cryptographic signature, the UE may compare each of the public keys (e.g., using a chosen PKI algorithm against the received plaintext included in the alert message) (e.g., in parallel and/or in series) to determine if one of the public key signatures matches the cryptographic signature generated by the associated private key of the network provider, thereby validating the alert message.

In some examples, in response to the public key signature matching the received cryptographic signature, the UE may present the alert message on a display of the UE. In some examples in response to the public key signature and/or none of the public key signatures matching the received cryptographic signature, the UE may refrain from presenting the alert message on the display of the UE. In some cases, the UE may determine that one of the public key signatures match the cryptographic signatures, but the UE may not present the alert message in response to determining that the UE is greater than a predefined distance (e.g., 100 m, 150 m, 200 m, etc.) from a geographic area associated with the alert message.

FIG. 1 is a block diagram showing an illustrative environment 100 for facilitating transmission of alert messages over a public network and/or a NPN. The environment 100 may include a network 102 that is operated by a wireless service provider and may include a public network and/or a NPN. The environment 100 is illustrated in simplified form and may include many more components.

Generally, the network 102 may include a base station 104 and one or more service nodes 106 that provide services (e.g., telecommunication services) to a computing device (referred to herein as a "UE") 108 while the UE 108 is located within a coverage area 110. A base station 104 may handle traffic and signals between electronic devices, such as the UE 108 and other computing devices (not shown), and a core network of the network 102. For example, the base station 104 may perform the transcoding of speech channels, allocation of radio channels to electronic devices, paging, transmission and reception of voice and data, as well as other functions.

The base station 104 may include several base transceiver stations (BTS). A BTS may include a transceiver, antenna, and additional network switch and control equipment that provide a network cell for facilitating wireless communication between computing devices and the core network of the network 102. In some instances, the base station 104 may include an eNodeB and/or a gNodeB.

The UE 108 may be an electronic device such as a smart phone, a personal digital assistant, a netbook, a laptop computer, and/or another electronic device that is capable of sending and/or receiving voice or data via the network 102 and/or a Wi-Fi network. For example, the UE 108 can be integrated into a vehicle, a drone, a plane, a bicycle, a mobile device, and the like. In some instances, the computing device 108 can be configured to send and receive data using any wired or wireless protocols.

For example, in configurations, the service nodes 106 may be associated with a network provider (e.g., telecommunication network provider) that may provide usage of a 5G network in the form of a NPN (e.g., private network and/or unlicensed network) covering a small geographic area, such as a factory, refinery, a university, enterprise campus, a stadium, and/or any area providing services for customers, employees, and/or students. In some examples, the network provider may be providing 5G network capabilities through unlicensed spectrum in a hosted fashion.

In some cases, the service nodes 106 may be associated with a network provider (e.g., telecommunication network provider) that may provide a public network, such as a wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VOIP, VOLTE, IEEE 802.1x protocols, wireless microwave access (WIMAX), WIFI, and/or any future IP-based network technology or evolution of an existing IP-based network technology.

In some examples, the network 102 may be a public network and/or a NPN and the service nodes 106 may utilize a PKI and provide a public key to a public key component 112 of the UE 108 that is desired to receive alert messages (e.g., emergency alert messages, WEA messages, etc.) while the UE 108 is connected to the public network and/or NPN. For example, the service nodes 106 may generate a first public key having a first public key signature that is associated with a public network (e.g., network 102) and provide the UE 108 with the first public key. The service nodes 106 may generate a corresponding first private key having a first private key signature that corresponds with the first public key such that, when a signed message is transmitted with the first private key signature, the first public key signature may validate the message.

In some examples, the service nodes 106 may utilize the PKI to generate a second public key having a second public key signature that is associated with a NPN covering a geographic area (e.g., providing network services to a factory, refinery, a university, enterprise campus, a stadium, etc.), such as the coverage area 110, and provide the public key component 112 of the UE 108 that is desired to receive messages from a public safety entity associated with the geographic area with the second public key. The service nodes 106 may generate a corresponding second private key having a second private key signature that corresponds with the second public key such that, when a signed message is transmitted with the second private key signature, the second public key signature may validate the message. In some case, the first public key and/or the second public key may be sent to the UE(s) 108 via an over-the-air (OTA) update.

In some examples, the service nodes 106 may receive an alert message 114 to be broadcast over a geographic area, such as the coverage area 110. In some examples, the alert message 114 may include a wireless emergency alert (WEA) associated with a public warning service (PWS) as defined by 3rd Generation Partnership Project (3GPP). For example, the alert message 114 may be received from a computing device (herein referred to as a "terminal") 116 associated with a public safety entity (e.g., governmental, federal, state, local, and/or tribal public safety agencies) and may include parameters, such as an alert level (e.g., low, medium, high, etc.), a nature of the alert (e.g., Amber alert, fire alert, weather alert, active shooter alert, etc.), a geographic area associated with the alert (e.g., street address, geographic address, distance within an address, etc.), a start time associated with the alert (e.g., time, date, etc.), and/or an end time associated with the alert (e.g., time, date, etc.). In some examples, the alert message 114 and/or the public safety entity may be operating on, and/or otherwise associated with, a public network and/or a NPN provided by the service nodes 106, such as the network 102.

In some cases, the service nodes 106 may generate a cryptographic signature 118 (also referred to as a "private key signature") on the alert message 114 using the first private key and/or the second private key. For example, the service nodes 106 may determine that the alert message 114 and/or the public safety entity associated with the terminal 116 may be operating on, and/or otherwise associated with, the public network and may generate the first private key signature on the alert message 114. In some cases, the service nodes 106 may determine that the alert message 114 and/or the public safety entity may be operating on, and/or otherwise associated with, the NPN and may generate the second private key signature on the alert message 114. In some examples, the service nodes 106 may determine that the alert message 114 and/or the public safety entity may be operating on, and/or otherwise associated with, the public network and may generate the second private key signature on the alert message 114. In this case, the service nodes 106 may determine that the alert message 114 is associated with a NPN even though the alert message 114 was not generated on the NPN. For example, the NPN may provide network access to a smaller geographic location, such as the coverage area 110, located within a larger geographic location that is covered by the public network, such as the network 102. The service nodes 106 of the NPN may receive alert message 114 from the public network and may generate either the second private key signature using the second private key associated with the NPN or the first private key signature using the first private key associated with the public network in cases where the service nodes 106 of the NPN also securely stores and/or otherwise has access to the first private key.

In some cases, once the service nodes 106 receive an alert message 114 and generates a cryptographic signature 118, the service nodes 106 may broadcast the alert message 114 and the cryptographic signature 118 to the UE 108 in the designated geographic area, such as the coverage area 110. For example, the service nodes 106 may store a list of cell sites and their geographic location. The service nodes 106 may broadcast the alert message 114 and the cryptographic signature 118 to the cell sites, such as to the base station 104, and/or directly to the UE 108 that are within the geographic area (e.g., coverage area 110) designated in the alert message 114. In some examples, the service nodes 106 may determine a geolocation associated with the alert message (e.g., based on geolocation details included in receiving the alert message 114) and determine which base station 104 and/or which coverage area 110 is included in the geolocation, or otherwise associated with the geolocation. The service nodes 106 may then send the alert message to the base station 104 based on the determined geolocation.

In some cases, the UE 108 may receive the first public key and/or the second public key via an OTA update and/or the UE 108 may securely store the first public key and/or the second public key via the public key component 112. In some examples, the public key component 112 may be securely stored in, and/or otherwise associated with, a USIM of the UE 108. In some cases, the first public key and/or the second public key are received by the UE 108 once the UE 108 has entered a geographic location, such as the coverage area 110, that is receiving network services from the network 102 (e.g., via a public network associated with the first public key and/or the NPN associated with the second public key). In some cases, the first public key and/or the second public key are provided to the UE 108 during a manufacturing phase of the UE 108 (e.g., via an original equipment manufacturer (OEM).

In some examples, the UE 108 may receive the alert message 114 broadcast from the service nodes 106 and/or the base station 104 including the cryptographic signature 118. For example, in some cases, the UE 108 may be monitoring a system information block (SIB) channel of the service nodes 106 and/or the base station 104 and may receive the alert message 114 and the cryptographic signature 118 via the SIB channel. In some examples, the UE 108 be operating in a low power mode and/or determine that a battery level associated with the UE 108 is below a threshold power level and the UE 108 may monitor the SIB channel periodically (e.g., every 5 seconds, 5 minutes, 10 minutes, etc.) in response to operating in the low power mode and/or the battery being below the threshold power level. In some cases, the UE 108 may monitor the SIB channel based on operating in an offline mode.

In some cases, the UE 108 may generate a first public key signature and/or a second public key signature and compare the first public key signature and/or the second public key signature to the received cryptographic signature 118. For example, the UE 108 may securely store multiple public keys, via the public key component 112, associated with respective networks (e.g., public networks and/or NPNs) that the UE 108 is connected to or within a geographic area, such as the coverage area 110, receiving service from the networks. In some examples, when the UE 108 receives an alert message 114 having a cryptographic signature 118, the UE 108 may compare each of the public key signatures (e.g., in parallel and/or in series) to determine if one of the public key signatures matches the cryptographic signature 118 generated by the associated private key of the service nodes 106, thereby validating the alert message 114. In some examples, the private key may be used to generate a cryptographically secure hash of plaintext included in the alert message 114. The UE 108 may run the received plaintext through the same algorithm via the public key component 112. The results of the calculation may be compared with the received private key signature 118 and if they match, then the message is deemed to be valid.

In some examples, in response to the public key signature matching the cryptographic signature 118, the UE 108 may present the alert message 114 on a display of the UE 108. In some examples in response to the public key signature not matching and/or none of the public keys matching the cryptographic signature 118, the UE 108 may refrain from presenting the alert message 114 on the display of the UE 108. In some cases, the UE 108 may determine that one of the public key signatures does match the cryptographic signature 118, but the UE 108 may not present the alert message 114 in response to determining that the UE 108 is greater than a predefined distance (e.g., 100 m, 150 m, 200 m, etc.) from a geographic area associated with the alert message 114.

Figure 2:
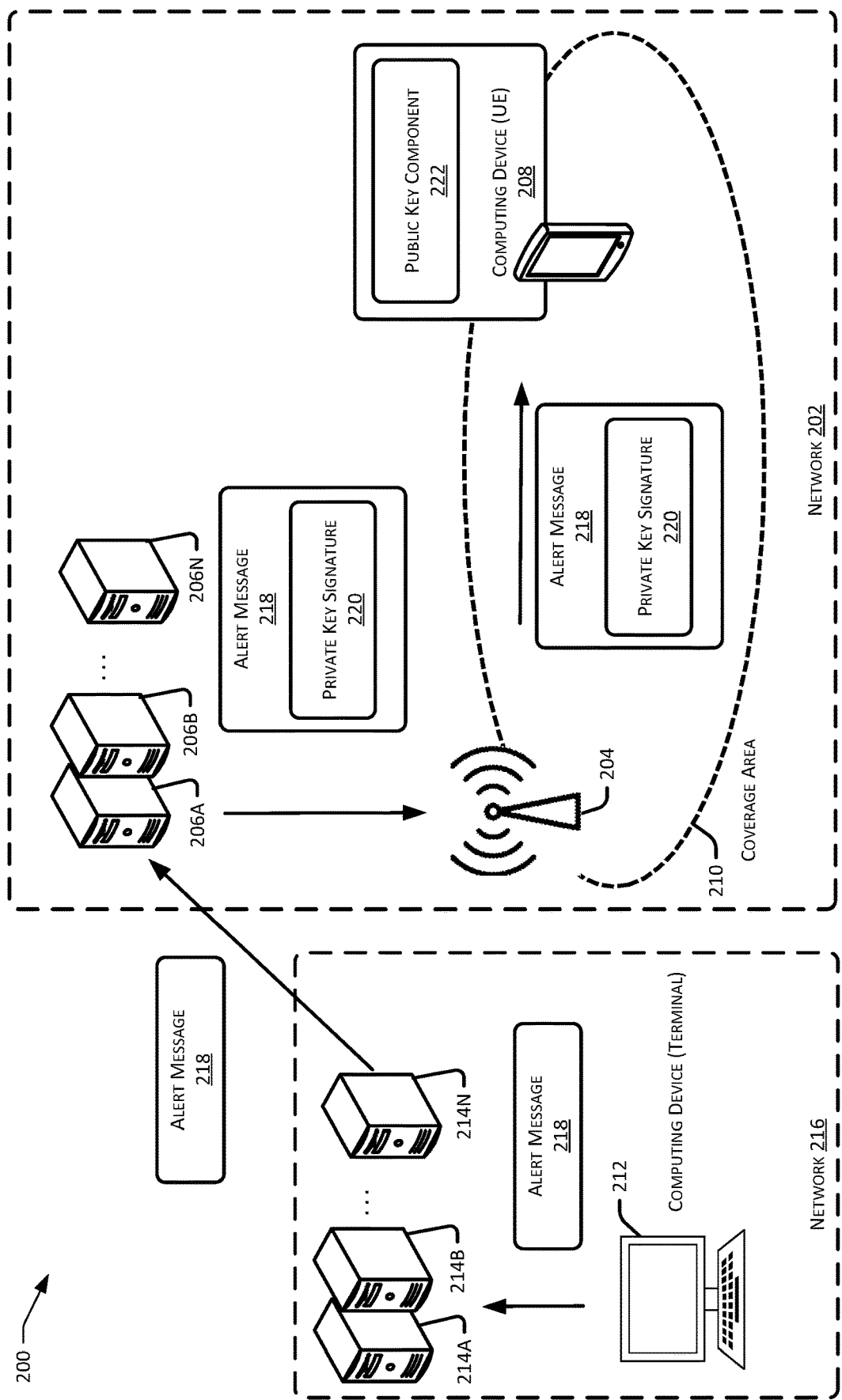
FIG. 2 is another pictorial diagram of a portion of an example wireless communication network configured to transmit alert messages, in accordance with various configurations.

FIG. 2 is a block diagram showing an illustrative environment 200 for facilitating transmission of alert messages over a public network and/or a NPN. The environment 200 may include a network 202 that is operated by a wireless service provider and may include a public network and/or a NPN. The environment 200 is illustrated in simplified form and may include many more components.

Generally, the network 200 may include a base station 204 and one or more service nodes 206 that provide services (e.g., telecommunication services) to a computing device (referred to herein as a "UE") 208 while the UE 208 is located within a coverage area 210. The network 202, the base station 204, the service nodes 206, and the UE 208 may contain the same or similar functionality as those described herein regarding the network 102, the base station 104, the service nodes 106, and the UE 108. The environment 200 may also include a terminal 212 and one or more service nodes 214. In some examples, the terminal 212 and the service nodes 214 may be operating on a network 216 that is separate from the network 202. In some examples, the network 202 may include a NPN provided by a network provider associated with the service nodes 206 and the network 216 may be a public network provided by a network provider associated with the service nodes 214. In some examples, although the network 202 and the network 216 are illustrated as separate networks, some geographic portions of the network 216 may overlap with geographic portions of the network 202. For example, the coverage area 210 may represent a geographic area that is located within a geographic area located within both of the network 202 and the network 216.

In some examples, the service nodes 214 may receive an alert message 218 to be broadcast over a geographic area, such as the coverage area 210. For example, the alert message 218 may be received from the terminal 212 associated with a public safety entity (e.g., governmental, federal, state, local, and/or tribal public safety agencies) and may include parameters, such as an alert level (e.g., low, medium, high, etc.), a nature of the alert (e.g., Amber alert, fire alert, weather alert, active shooter alert, etc.), a geographic area associated with the alert (e.g., street address, geographic address, distance within an address, etc.), a start time associated with the alert (e.g., time, date, etc.), and/or an end time associated with the alert (e.g., time, date, etc.).

In some examples, the service nodes 214 may send the alert message to the service nodes 206 to be transmitted over the network 202. For example, the network 216 may be public network and the network 202 may be a NPN. The service nodes 214 may desire to have the alert message broadcast via the network 202 such that the broadcast is sent to any UE (e.g., the UE 208) operating on the network 202.

In some cases, the service nodes 206 may securely store multiple private keys capable of generating respective private key signatures. In some examples, a first private key may be associated with a public network, such as the network 216, and a second private key may be associated with a NPN, such as the network 202. In some cases, the service nodes 206 may generate a cryptographic signature 220 (also referred to as a "private key signature") on the alert message 218 using the first private key and/or the second private key. For example, the service nodes 206 may determine that the alert message 218 and/or the public safety entity associated with the terminal 212 may be operating on, and/or otherwise associated with, the public network and may generate the first private key signature on the alert message 218. In some examples, the service nodes 206 may determine that the alert message 218 and/or the public safety entity may be operating on, and/or otherwise associated with, the public network (e.g., network 216) and may generate the second private key signature on the alert message 218. In this case, the service nodes 206 may determine that the alert message 218 is associated with the network 202 even though the alert message 218 was not generated on the network 202. For example, the network 202 may provide network access to a smaller geographic location, such as the coverage area 210, located within a larger geographic location that is covered by the network 216. The service nodes 206 of the network 202 may receive alert message 218 from the public network and may generate either the second private key signature using the second private key associated with the network 202 or the first private key signature using the first private key associated with the network 216 in cases where the service nodes 206 of the network 202 also securely stores and/or otherwise has access to the first private key.

In some cases, once the service nodes 206 receive an alert message 218 and generates a cryptographic signature 220, the service nodes 206 may broadcast the alert message 218 and the cryptographic signature 220 to the UE 208 in the designated geographic area, such as the coverage area 210. For example, the service nodes 206 may store a list of cell sites and their geographic location. The service nodes 206 may broadcast the alert message 218 and the cryptographic signature 220 to the cell sites, such as to the base station 204, and/or directly to the UE 208 that are within the geographic area (e.g., coverage area 210) designated in the alert message 218.

In some cases, the UE 208 may receive the first public key and/or the second public key via an OTA update and/or the UE 208 may securely store the first public key and/or the second public key via the public key component 222. In some examples, the public key component 222 may be securely stored in, and/or otherwise associated with, a USIM of the UE 208. In some cases, the first public key and/or the second public key are received by the UE 208 once the UE 208 has entered a geographic location, such as the coverage area 210, that is receiving network services from the network 102 (e.g., via a public network associated with the first public key and/or the NPN associated with the second public key). In some cases, the first public key and/or the second public key are provided to the UE 208 during a manufacturing phase of the UE 208 (e.g., via an original equipment manufacturer (OEM).

In some examples, the UE 208 may receive the alert message 218 broadcast from the service nodes 206 and/or the base station 204 including the cryptographic signature 220. For example, in some cases, the UE 208 may be monitoring a system information block (SIB) channel of the service nodes 206 and/or the base station 204 and may receive the alert message 218 and the cryptographic signature 220 via the SIB channel. In some examples, the UE 208 be operating in a low power mode and/or determine that a battery level associated with the UE 208 is below a threshold power level and the UE 208 may monitor the SIB channel periodically (e.g., every 5 seconds, 5 minutes, 10 minutes, etc.) in response to operating in the low power mode and/or the battery being below the threshold power level.

In some cases, the UE 208 may generate a first public key signature and/or a second public key signature and compare the first public key signature and/or the second public key signature to the cryptographic signature 220. For example, the UE 208 may securely store multiple public keys, via the public key component 222, associated with respective networks (e.g., public networks and/or NPNs) that the UE 208 is connected to or within a geographic area, such as the coverage area 210, receiving service from the networks. In some examples, when the UE 208 receives an alert message 218 having a cryptographic signature 220, the UE 208 may compare each of the public keys (e.g., in parallel and/or in series) to determine if one of the public key signatures matches the cryptographic signature 220 generated by the associated private key of the service nodes 206, thereby validating the alert message 218.

In some examples, in response to the public key signature matching the cryptographic signature 220, the UE 208 may present the alert message 218 on a display of the UE 208. In some examples in response to the public key signature not matching and/or none of the public keys matching the cryptographic signature 220, the UE 208 may refrain from presenting the alert message 218 on the display of the UE 208. In some cases, the UE 208 may determine that one of the securely stored public key signatures does match the cryptographic signature 220, but the UE 208 may not present the alert message 218 in response to determining that the UE 208 is greater than a predefined distance (e.g., 100 m, 150 m, 200 m, etc.) from a geographic area associated with the alert message 218.

Figure 3:
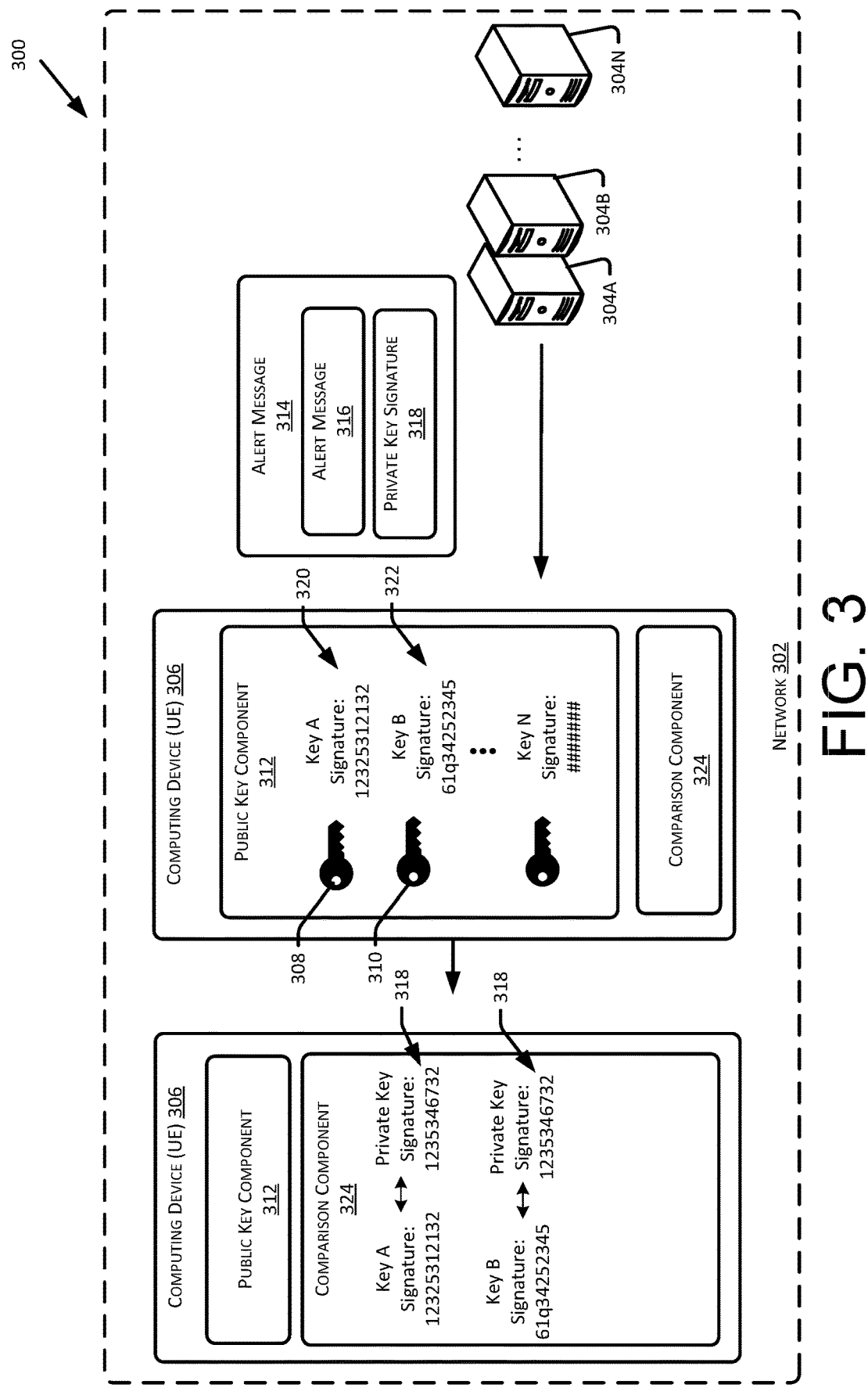
FIG. 3 is another pictorial diagram of a portion of an example wireless communication network configured to transmit alert messages, in accordance with various configurations.

FIG. 3 is a block diagram showing an illustrative environment 300 for facilitating transmission of alert messages over a public network and/or a NPN. The environment 300 may include a network 302 that is operated by a wireless service provider and may include a public network and/or a NPN. The environment 300 is illustrated in simplified form and may include many more components.

In some cases, the environment 300 may include one or more service nodes 304 associated with a network provider of the network 302 and/or a UE 306. In some cases, the service nodes 304 and/or the UE 306 may include the same or similar functionality to the service nodes 106, the service nodes 206, the UE 108, and/or the UE 208, as described herein.

In some cases, the UE 306 may receive multiple public keys based on a network that the UE 306 is connecting with and/or is otherwise in contact with. For example, the UE 306 may receive a first public key 308 and/or a second public key 310 and securely store the public keys in a public key component 312. In some examples, the first public key 308 may be associated with a public network and the second public key 310 may be associated with a NPN. In some cases, the UE 306 may receive the first public key 308 and/or the second public key 310 via an OTA update and/or the UE 306 may securely store the first public key 308 and/or the second public key 310 via the public key component 312. In some examples, the public key component 312 may be securely stored in, and/or otherwise associated with, a USIM of the UE 306. In some cases, the first public key 308 and/or the second public key 310 are received by the UE 306 once the UE 306 has entered a geographic location, such as a coverage area that is receiving network services from the network 302 (e.g., via a public network associated with the first public key 308 and/or a NPN associated with the second public key 310). In some cases, the first public key 308 and/or the second public key 310 are provided to the UE 306 during a manufacturing phase of the UE 306 (e.g., via an original equipment manufacturer (OEM).

In some examples, the UE 306 may receive an alert message 314 broadcast from the service nodes 304 and/or a base station including an alert message 316 and cryptographic signature 318 usable to validate the signed alert message 316. For example, in some cases, the UE 306 may be monitoring a system information block (SIB) channel of the service nodes 304 and/or the base station and may receive the alert message 314 via the SIB channel. In some examples, the UE 306 be operating in a low power mode and/or determine that a battery level associated with the UE 306 is below a threshold power level and the UE 306 may monitor the SIB channel periodically (e.g., every 5 seconds, 5 minutes, 10 minutes, etc.) in response to operating in the low power mode and/or the battery being below the threshold power level.

In some cases, the UE 306 may generate a first public key signature and/or a second public key signature and compare a first public key signature 320 and/or a second public key signature 322 to the cryptographic signature 318. For example, the UE 306 may securely store multiple public keys, via the public key component 312, associated with respective networks (e.g., public networks and/or NPNs) that the UE 306 is connected to or within a geographic area receiving service from the networks. In some examples, when the UE 306 receives an alert message 314 having a cryptographic signature 318, a comparison component 324 of the UE 306 may compare each of the public key signatures (e.g., in parallel and/or in series) to determine if one of the public key signatures matches the cryptographic signature 318 generated by the associated private key of the service nodes 304, thereby validating the signed alert message 316.

In some examples, in response to one of the public key signatures 320 and/or 322 matching the cryptographic signature 318, the UE 306 may present the signed alert message 316 on a display of the UE 306. In some examples in response to the public key signatures 320 and/or 322 not matching the cryptographic signature 318, the UE 306 may refrain from presenting the signed alert message 316 on the display of the UE 306. In some cases, the UE 306 may determine that one of the securely stored public key signatures does match the cryptographic signature 318, but the UE 306 may not present the signed alert message 316 in response to determining that the UE 306 is greater than a predefined distance (e.g., 100 m, 150 m, 200 m, etc.) from a geographic area associated with the alert message 314.

It is understood that the example values presented in FIG. 3 for the private key signature 318 and the public key signatures 320 and/or 322 are example values and that the values for the private key signature 318 and the public key signatures 320 and/or 322 may be any numerical and/or alphabetical sequence. Additionally, although the public key component 312 illustrates securely storing a first public key signature 320 and/or a second public key signature 322, it is understood that the public key component 312 may securely store any number of public keys usable to validate an alert message associated with a private key signature.

Figure 4:
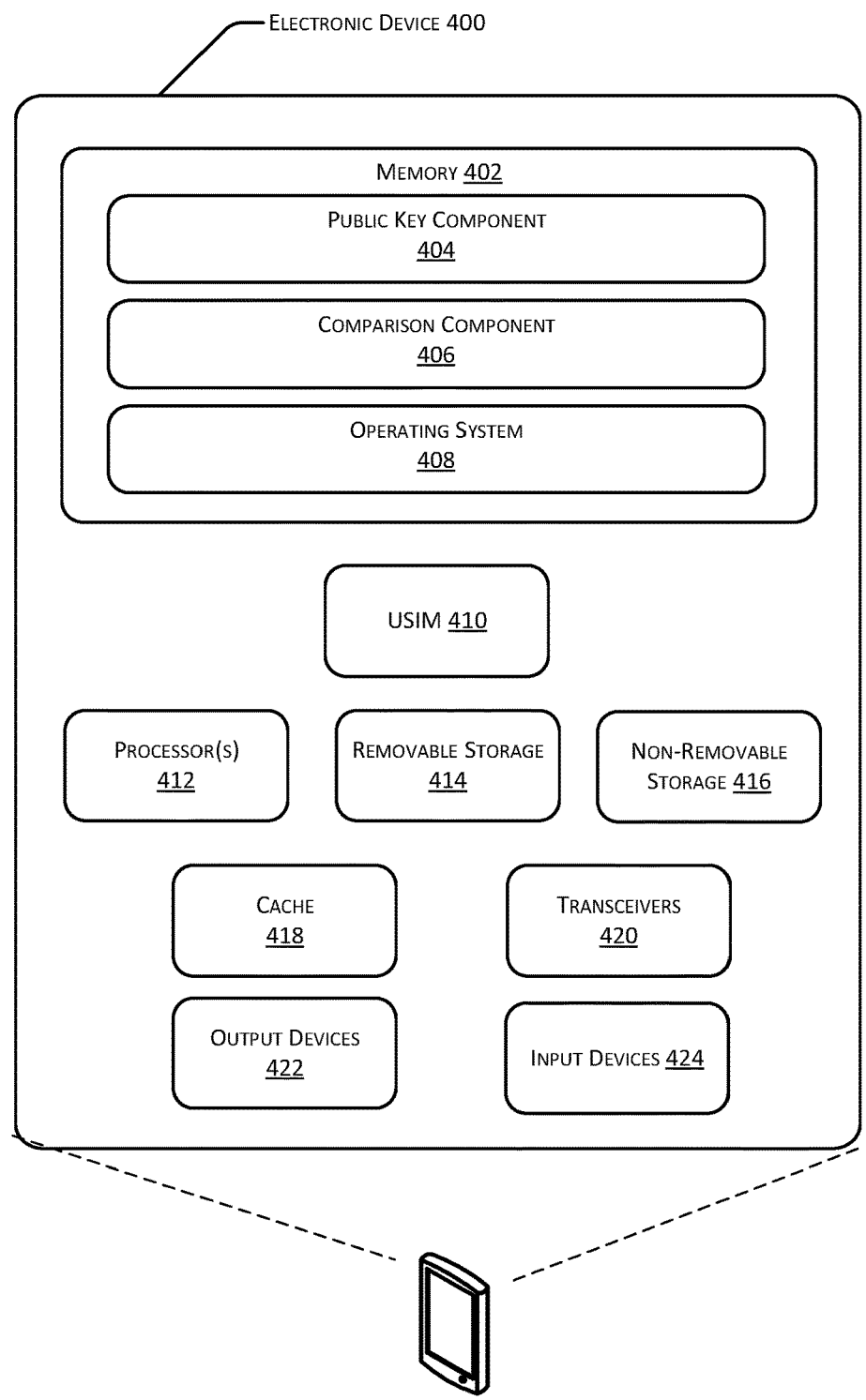
FIG. 4 schematically illustrates a component level view of an example electronic device configured for use in the wireless communication network of FIGS. 1, 2, and 3, in accordance with various configurations.

FIG. 4 schematically illustrates a component level view of an example electronic device 400, such as UE 108, UE 208, and/or UE 306, configured to function within the environments 100, 200, and/or 300. The electronic device 400 may include more or less components depending on the type of electronic device. As illustrated, the electronic device 400 comprises a system memory 402, e.g., computer-readable media, storing a public key component 404 (e.g., including the same or similar functionality as the public key components 112, 222, and/or 312), a comparison component 406 (e.g., including the same or similar functionality as the comparison component 324), and/or an operating system 408. The electronic device 400 may also include a USIM 410, processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit. Although the public key component 404 is illustrated as being stored in the memory 402, any one or more of the public key component 404 (e.g., including the same or similar functionality as the public key components 112, 222, and/or 312), the comparison component 406 (e.g., including the same or similar functionality as the comparison component 324), and/or the operating system 408 may be stored in a secure memory box separate from the memory 402.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 720 include any sort of transceivers known in the art. For example, the transceivers 720 may include a radio transceiver that performs the function of transmitting and receiving radio frequency communications via an antenna (not shown). Also, or alternatively, the transceivers 720 may include wireless modem(s) to facilitate wireless connectivity with other computing devices. Further, the transceivers 720 may include wired communication components, such as an Ethernet port, for communicating with other networked devices.

In some implementations, the output devices 722 include any sort of output devices known in the art, such as a display (e.g., a liquid crystal display), speakers, a vibrating mechanism, or a tactile feedback mechanism. Output devices 722 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

In various implementations, the public key component 404 may be configured to receive multiple public keys based on a network that the electronic device 400 is connecting with and/or is otherwise in contact with. For example, the public key component 404 may receive a first public key and/or a second public key and securely store the public keys. In some examples, the first public key may be associated with a public network and the second public key may be associated with a NPN. In some cases, the public key component 404 may receive the first public key and/or the second public key via an OTA update and/or the public key component 404 may securely store the first public key and/or the second public key. In some examples, the public key component 404 may be securely stored in, and/or otherwise associated with, the USIM 410. In some cases, the first public key and/or the second public key are received by the public key component 404 once the electronic device 400 has entered a geographic location, such as a coverage area that is receiving network services from a network (e.g., via a public network associated with the first public key and/or a NPN associated with the second public key). In some cases, the first public key and/or the second public key are provided to the public key component 404 during a manufacturing phase of the electronic device 400 (e.g., via an original equipment manufacturer (OEM).

In various implementations, the comparison component 406 may be configured to generate a first public key signature and/or a second public key signature and compare a first public key signature and/or a second public key signature to the cryptographic signature. For example, the public key component 404 may securely store multiple public keys associated with respective networks (e.g., public networks and/or NPNs) that the electronic device 400 is connected to or within a geographic area receiving service from the networks. In some examples, when the electronic device 400 receives an alert message having a cryptographic signature, the comparison component 406 may compare each of the public key signatures (e.g., in parallel and/or in series) to determine if one of the public key signatures matches the cryptographic signature generated by the associated private key of the service nodes, thereby validating the signed alert message. In some examples, the comparison component 406 may prioritize (e.g., based on a priority) a particular public key signature to utilize in a comparison with the private key signature based on one or more factors. In some examples, the one or more factors may be a likelihood (e.g., percent chance) that the public key signature will match the private key signature. In some cases, the likelihood may be based on determining a source of the public key and/or a source of the alert message. For example, if one of the public key signatures is generated from a public key that was received from a source closer to (or is the same) as the source that transmitted the alert message, the comparison component 406 may determine to use that public key signature in a comparison before other public key signatures.

In some examples, in response to one of the public key signatures matching the cryptographic signature, the comparison component 406 may present the signed alert message on a display of the electronic device 400. In some examples in response to the public key signatures not matching the cryptographic signature, the comparison component 406 may refrain from presenting the signed alert message on the display of the electronic device 400. In some cases, the comparison component 406 may determine that one of the securely stored public key signatures does match the cryptographic signature, but the electronic device 400 may not present the signed alert message in response to determining that the electronic device 400 is greater than a predefined distance (e.g., 100 m, 150 m, 200 m, etc.) from a geographic area associated with the alert message.

The electronic device 400 may be implemented as any suitable device that may be configured as a "connected device," e.g., an Internet of things (IoT) device, a machine to machine (M2M) device, etc. The electronic device 400 may also be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the electronic device 400 as being "mobile" (i.e., configured to be carried and moved around), it is to be appreciated that the electronic device 400 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein.

Furthermore, the electronic device 400 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), Voice over LTE (VOLTE), 5G, IEEE 802.1x protocols, WiMAX, Wi-Fi, and/or any future IP-based network technology or evolution of an existing IP-based network technology.

Figure 5:
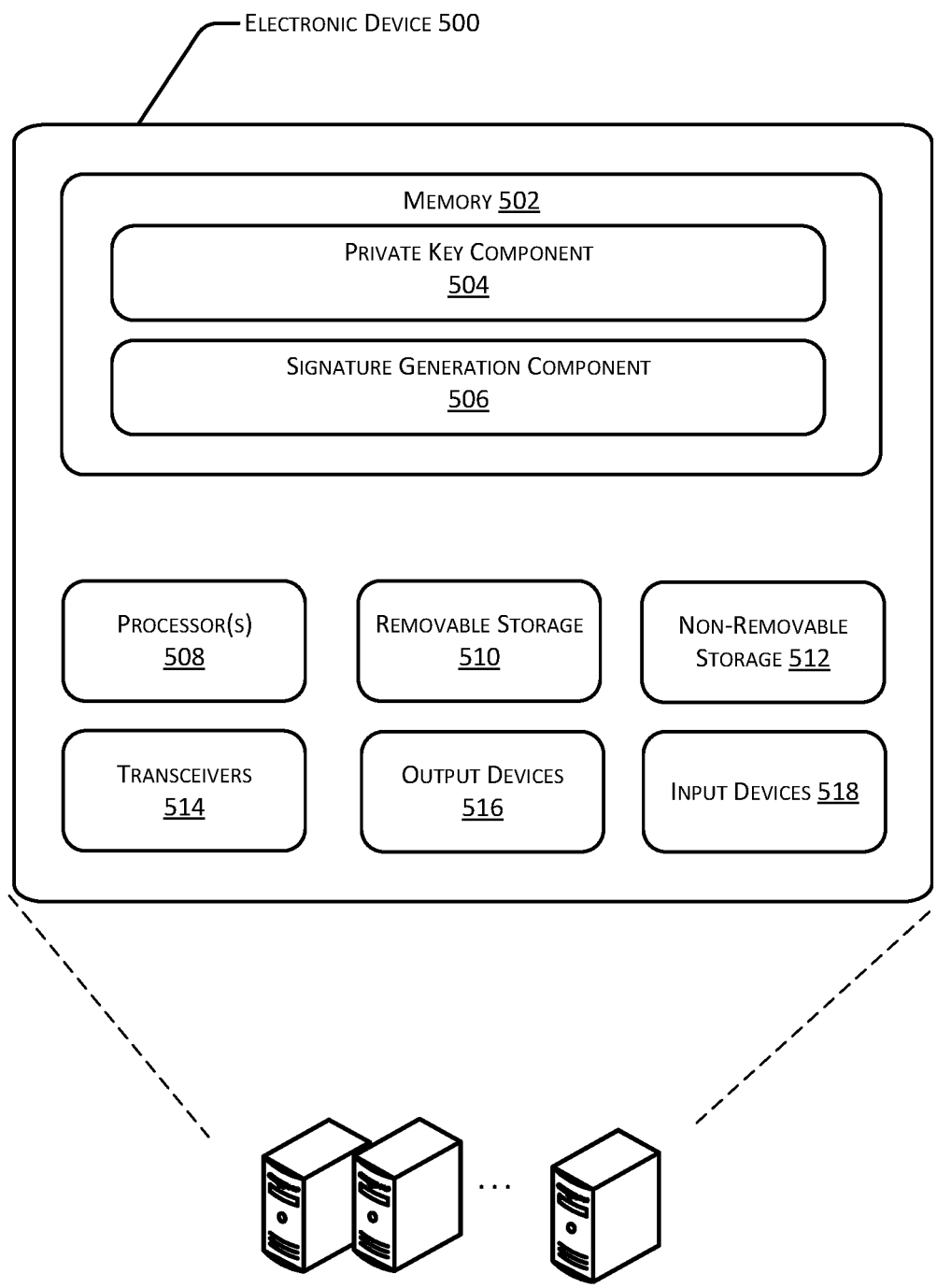
FIG. 5 schematically illustrates a component level view of another example electronic device configured for use in the wireless communication network of FIGS. 1, 2, and 3, in accordance with various configurations.

FIG. 5 illustrates a component level view of an electronic device 500 configured for use within a wireless communication network, e.g., the environments 100, 200, and/or 300 in order to provide various services within the wireless communication network, according to the techniques described herein. The electronic device 500 may include the same or similar functionality to those described with respect to the service nodes 106, 206, and/or 304. As illustrated, the electronic device 500 comprises a system memory 502 that may securely store one or more components such as a private key component 504 and/or a signature generation component 506 for interacting with electronic devices 400, as described herein. Also, the electronic device 500 may include processor(s) 508, a removable storage 510, a non-removable storage 512, transceivers 514, output device(s) 516, and input device(s) 518. Although the private key component 504 is illustrated as being stored in the memory 502, any one or more of the private key component 504 and/or a signature generation component 506 may be stored in a secure memory box separate from the memory 502.

In various implementations, system memory 502 is volatile (such as RAM), non-volatile (such as ROM, flash memory, etc.), or some combination of the two. In some implementations, the processor(s) 508 is a Central Processing Unit (CPU), a Graphics Processing Unit (GPU), or both CPU and GPU, or any other sort of processing unit.

The electronic device 500 may also include additional data storage devices (removable and/or non-removable) such as, for example, magnetic disks, optical disks, or tape. Such additional storage is illustrated in FIG. 5 by removable storage 510 and non-removable storage 512.

Non-transitory computer-readable media may include volatile and nonvolatile, removable and non-removable tangible, physical media implemented in technology for storage of information, such as computer readable instructions, data structures, program modules, or other data. System memory 502, removable storage 510 and non-removable storage 512 are all examples of non-transitory computer-readable media. Non-transitory computer-readable media include, but are not limited to, RAM, ROM, EEPROM, flash memory or other memory technology, CD-ROM, Digital Versatile Discs (DVD) or other optical storage, magnetic cassettes, magnetic tape, magnetic disk storage or other magnetic storage devices, or any other tangible, physical medium which can be used to store the desired information and which can be accessed by the electronic device 500. Any such non-transitory computer-readable media may be part of the electronic device 500.

In some implementations, the transceivers 514 include any sort of transceivers known in the art. For example, the transceivers 514 may include wired communication components, such as an Ethernet port, for communicating with other networked devices. Also, or instead, the transceivers 514 may include wireless modem(s) to facilitate wireless connectivity with other computing devices. Further, the transceivers 514 may include a radio transceiver that performs the function of transmitting and receiving radio frequency communications via an antenna.

In some implementations, the output devices 516 include any sort of output devices known in the art, such as a display (e.g., a liquid crystal display), speakers, a vibrating mechanism, or a tactile feedback mechanism. Output devices 516 also include ports for one or more peripheral devices, such as headphones, peripheral speakers, or a peripheral display.

In various implementations, input devices 518 include any sort of input devices known in the art. For example, input devices 518 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 and memory 502 are examples of computer storage media.

The computer storage media may include volatile memory (such as random-access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

Some or all of the components discussed herein may be utilized to provide and/or otherwise support a network, such as the networks 102, 202, 216, and/or 302. For example, in configurations, the electronic device 500 may provide usage of a 5G network in the form of a NPN (e.g., private network and/or unlicensed network) covering a small geographic area, such as a factory, refinery, a university, enterprise campus, a stadium, and/or any area providing services for customers, employees, and/or students. In some examples, the network provider may be providing 5G network capabilities through unlicensed spectrum in a hosted fashion.

In some cases, the electronic device 500 may provide a public network, such as a wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VOIP, VOLTE, IEEE 802.1x protocols, wireless microwave access (WIMAX), WIFI, and/or any future IP-based network technology or evolution of an existing IP-based network technology.

In various implementations, the private key component 504 and the signature generation component 506 may be configured to generate and/or securely store private keys usable to generate private key signatures on one or more alert messages. For example, the electronic device 500 may generate a cryptographic signature (also referred to as a "private key signature") on an alert message using a first private key and/or a second private key. For example, the electronic device 500 may determine that the alert message and/or the public safety entity associated with the terminal may be operating on, and/or otherwise associated with, the public network and may generate the first private key signature on the alert message. In some cases, the electronic device 500 may determine that the alert message and/or the public safety entity may be operating on, and/or otherwise associated with, the NPN and may generate the second private key signature on the alert message. In some examples, the electronic device 500 may determine that the alert message and/or the public safety entity may be operating on, and/or otherwise associated with, the public network and may generate the second private key signature on the alert message. In this case, the electronic device 500 may determine that the alert message is associated with a NPN even though the alert message was not generated on the NPN. For example, the NPN may provide network access to a smaller geographic location, such as a coverage area, located within a larger geographic location that is covered by the public network. The electronic device 500 may receive alert message from the public network and may generate either the second private key signature using the second private key associated with the NPN or the first private key signature using the first private key associated with the public network in cases where the electronic device 500 of the NPN also securely stores and/or otherwise has access to the first private key.

Figure 6:
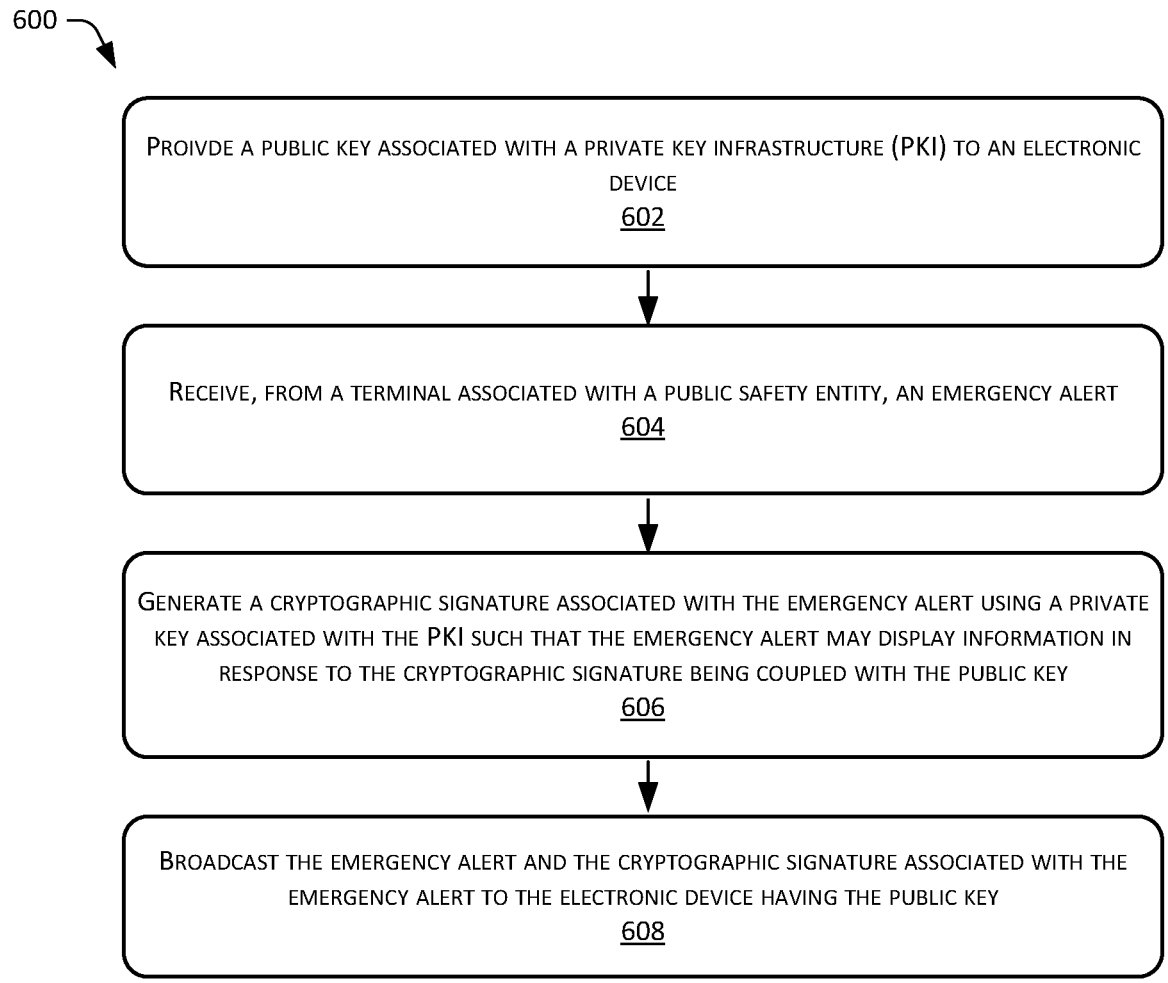
FIG. 6 is a flow diagram of an example process of broadcasting an alert message, in accordance with various configurations.
Figure 7:
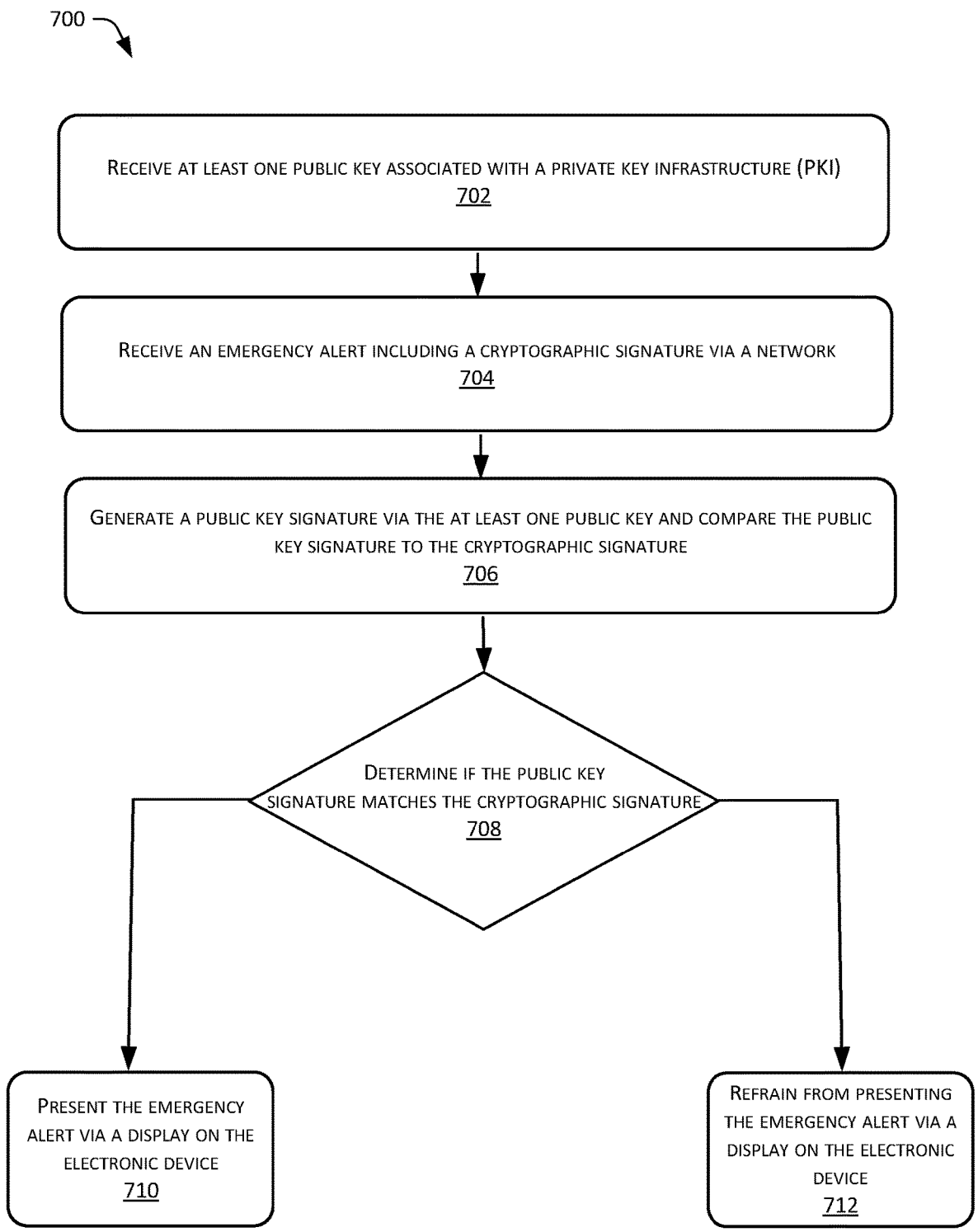
FIG. 7 is a flow diagram of an example process of receiving an alert message, in accordance with various configurations.

FIGS. 6 and 7 illustrate processes for a public warning service for public and non-public networks. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures and systems.

FIG. 6 illustrates a flow diagram of an example process 600 for broadcasting a cryptographically signed alert message in accordance with the system discussed herein. The order in which the operations or steps are described is not intended to be construed as a limitation, and any number of the described operations may be combined in any order and/or in parallel to implement process 600. The operations described with respect to the process 600 are described as being performed by one or more servers (e.g., service nodes 106, 206, 304, and/or electronic device 500). However, it should be understood that some or all of these operations may be performed by some or all of components, devices, and/or systems described herein.

At block 602, the process 600 may include the one or more servers providing a public key associated with a private key infrastructure (PKI) to an electronic device. For example, the network provider may utilize a PKI and provide a public key to a UE that is desired to receive alert messages (e.g., emergency alert messages, WEA messages, etc.) while the UE is connected to the public network and/or NPN. For example, the network provider may generate a first public key having a first public key signature that is associated with a public network and provide the UE with the first public key.

In some examples, the network provider may utilize the PKI to generate a second public key having a second public key signature that is associated with a NPN covering a geographic area (e.g., providing network services to a factory, refinery, a university, enterprise campus, a stadium, etc.) and provide a UE that is desired to receive messages from a public safety entity within the geographic area with the second public key. In some case, the first public key and/or the second public key may be sent to the UE(s) via an over-the-air (OTA) update.

At block 604, the process 600 may include the one or more servers receiving, from a terminal associated with a public safety entity, an emergency alert broadcast. For example, a network provider may receive an alert message to be broadcast over a geographic area. For example, the alert message may be received from a terminal associated with a public safety entity (e.g., governmental, federal, state, local, and/or tribal public safety agencies) and may include parameters, such as an alert level (e.g., low, medium, high, etc.), a nature of the alert (e.g., Amber alert, fire alert, weather alert, active shooter alert, etc.), a geographic area associated with the alert (e.g., street address, geographic address, distance within an address, etc.), a start time associated with the alert (e.g., time, date, etc.), and/or an end time associated with the alert (e.g., time, date, etc.). In some examples, the alert message and/or the public safety entity may be operating on, and/or otherwise associated with, a public network and/or a NPN provided by the network provider.

At block 606, the process 600 may include the one or more servers generating a cryptographic signature associated with the emergency alert using a private key associated with the PKI such that the emergency alert may display information in response to the cryptographic signature being coupled with the public key. For example, a network provider may determine that the alert message and/or the public safety entity may be operating on, and/or otherwise associated with, the public network and may generate the first private key signature on the alert message. In some cases, the network provider may determine that the alert message and/or the public safety entity may be operating on, and/or otherwise associated with, the NPN and may generate the second private key signature on the alert message. In some examples, the network provider may determine that the alert message and/or the public safety entity may be operating on, and/or otherwise associated with, the public network and may generate the second private key signature on the alert message. In this case, the network provider may determine that the alert message is associated with a NPN even though the alert message was not generated on the NPN. For example, the NPN may provide network access to a smaller geographic location located within a larger geographic location that is covered by the public network. The network provider of the NPN may receive alert messages from the public network and may generate either the second private key signature using the second private key associated with the NPN or the first private key signature using the first private key associated with the public network in cases where the network provider of the NPN also securely stores and/or otherwise has access to the first private key.

At block 608, the process 600 may include the one or more servers broadcasting the emergency alert and the cryptographic signature associated with the emergency alert to the electronic device having the public key. For example, a network provider may broadcast the alert message and the cryptographic signature to UEs in the designated geographic area. For example, the network provider may store a list of cell sites and their geographic location. The network provider may broadcast the alert message and the cryptographic signature to the cell sites and/or directly to the UEs that are within the geographic area designated in the alert message.

FIG. 7 illustrates a flow diagram of an example process 700 for receiving a cryptographically signed alert message in accordance with the system discussed herein. The order in which the operations or steps are described is not intended to be construed as a limitation, and any number of the described operations may be combined in any order and/or in parallel to implement process 700. The operations described with respect to the process 700 are described as being performed by one or electronic devices (e.g., UE 108, UE 208, UE 306, and/or electronic device 400). However, it should be understood that some or all of these operations may be performed by some or all of components, devices, and/or systems described herein.

At block 702, the process 700 may include the electronic device receiving at least one public key associated with a private key infrastructure (PKI). For example, a UE may receive the first public key and/or the second public key via an OTA update and/or the UE may securely store the first public key and/or the second public key in a SIM of the UE. In some cases, the first public key and/or the second public key are received by the UE once the UE has entered a geographic location that is receiving network services from the public network associated with the first public key and/or the NPN associated with the second public key. In some cases, the first public key and/or the second public key are provided to the UE during a manufacturing phase of the UE (e.g., via an original equipment manufacturer (OEM).

At block 704, the process 700 may include the electronic device receiving an emergency alert broadcast including a cryptographic signature via a network. For example, a UE may receive the alert message broadcast from the network provider and/or a cell site of the network provider including the cryptographic signature. For example, in some cases, the UE may be monitoring a system information block (SIB) channel of the network provider and/or the cell site and may receive the alert message and the cryptographic signature via the SIB channel.

At block 706, the process 700 may include the electronic device generating a public key signature via the public key and comparing the public key signature to the cryptographic signature. For example, a UE may generate a first public key signature and/or a second public key signature and compare the first public key signature and/or the second public key signature to the cryptographic signature. For example, the UE may securely store multiple public keys associated with respective networks (e.g., public networks and/or NPNs) that the UE is connected to or within a geographic area receiving service from the networks. In some examples, when the UE receives an alert message having a cryptographic signature, the UE may compare each of the public key signatures (e.g., in parallel and/or in series) to determine if one of the public key signatures matches the cryptographic signature generated by the associated private key of the network provider, thereby validating the alert message.

At block 708, the process 700 may include the electronic device determining if the public key signature matches the cryptographic signature and at block 710, the process 700 may include the electronic device causing, in response to the public key signature matching the cryptographic signature, the emergency alert to be presented via a display on the electronic device. For example, in response to the public key signature matching the cryptographic signature, a UE may present the alert message on a display of the UE.

At block 712, the process 700 may include the electronic device causing, in response to the all public key signatures not matching the cryptographic signature, the display to refrain from presenting the emergency alert. For example, in response to the public key signature and/or none of the public keys matching the cryptographic signature, the UE may refrain from presenting the alert message on the display of the UE.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more servers, the method comprising:
    providing a first public key associated with a private key infrastructure (PKI) to an electronic device when the electronic device enters a geographic location associated with a public network;
    determining a first priority associated with the first public key based at least in part on a determined first likelihood that the first public key will match a received private key signature;
    providing a second public key associated with a second PKI to the electronic device when the electronic device enters a geographic location associated with a non-public network (NPN), wherein the NPN is distinct from the public network;
    determining a second priority associated with the second public key based at least in part on a determined second likelihood that the second public key will match the received private key signature;
    receiving, from a terminal associated with a public safety entity, an emergency alert over the public network;
    generating, based at least in part on the first priority, a first cryptographic signature associated with the emergency alert using a first private key associated with the PKI such that the emergency alert may display information in response to the first cryptographic signature being coupled with the first public key;
    generating, based at least in part on the second priority, a second cryptographic signature associated with the emergency alert using a second private key such that the emergency alert may display information in response to the second cryptographic signature being coupled with the second public key; and
    broadcasting the emergency alert and the second cryptographic signature over at least the NPN to the electronic device.

2. The method of claim 1, wherein the one or more servers are associated with the NPN.

3. The method of claim 1, wherein the one or more servers are associated with the NPN, and the NPN includes a fifth generation (5G) network.

4. The method of claim 1, wherein the emergency alert comprises a wireless emergency alert (WEA) associated with a public warning service (PWS) as defined by 3rd Generation Partnership Project (3GPP).

5. The method of claim 1, further comprising receiving, from the public safety entity, parameters associated with the emergency alert including at least one of:
    an alert level;
    a nature of the emergency alert;
    a geographic area associated with the emergency alert;
    a start time associated with the emergency alert; or
    an end time associated with the emergency alert.

6. The method of claim 1, wherein broadcasting the emergency alert and the second cryptographic signature comprises broadcasting over a system information block (SIB) channel.

7. The method of claim 1, further comprising:
determining at least one cell site associated with the geographic location associated with the NPN; and
broadcasting the emergency alert and the second cryptographic signature associated with the emergency alert to the at least one cell site based at least in part on the at least one cell site being associated with the geographic location associated with the NPN.

8. The method of claim 1, wherein providing the first public key associated with the PKI to the electronic device comprises at least one of:
sending the first public key to a SIM associated with the electronic device; or
sending the first public key to the electronic device via an over-the-air (OTA) update.

9. An electronic device configured for operation within a wireless communication network, the electronic device comprising:
one or more processors; and
a non-transitory storage medium comprising instructions stored thereon, the instructions being executable by the one or more processors to cause operations comprising:
receiving at least a first public key associated with a private key infrastructure (PKI) when the electronic device enters a geographic location associated with a public network;
determining a first priority associated with the first public key based at least in part on a determined first likelihood that the first public key will match a received private key signature;
receiving at least a second public key associated with a second PKI when the electronic device enters a geographic location associated with a non-public network (NPN);
determining a second priority associated with the second public key based at least in part on a determined second likelihood that the second public key will match the received private key signature;
receiving an emergency alert including a cryptographic signature;
generating a public key signature via the second public key based at least in part on the second priority and comparing the public key signature to the cryptographic signature;
determining a geolocation associated with the emergency alert;
determining location data associated with the electronic device; and
causing, at least one of:
presenting the emergency alert on a display of the electronic device in response to (A) determining that the location data indicates that the electronic device is within a threshold distance from the geolocation associated with the emergency alert and (B) the public key signature matching the cryptographic signature; or
in response to at least one of (A) determining that the location data indicates that the electronic device is above the threshold distance from the geolocation associated with the emergency alert or (B) a mismatch between the public key signature and the cryptographic signature, refraining from presenting the emergency alert on the display.

10. The electronic device of claim 9, the operations further comprising:
monitoring a system information block (SIB) channel associated with the wireless communication network; and
receiving the emergency alert via the SIB channel.

11. The electronic device of claim 10, the operations further comprising monitoring the SIB channel in response to at least one of:
operating in an offline mode; or
operating in a low power mode.

12. The electronic device of claim 9, wherein determining at least one of the first priority or the second priority is based at least in part on determining a first distance from the electronic device of a first source of the first public key and determining a second distance from the electronic device of a second source of the second public key.

13. A system comprising:
one or more servers configured to perform operations comprising:
providing a first public key associated with a private key infrastructure (PKI) to an electronic device when the electronic device enters a geographic location associated with a public network;
determining a first priority associated with the first public key based at least in part on a determined first likelihood that the first public key will match a received private key signature;
providing a second public key associated with a second PKI to the electronic device when the electronic device enters a geographic location associated with a non-public network (NPN), wherein the NPN is distinct from the public network;
determining a second priority associated with the second public key based at least in part on a determined second likelihood that the second public key will match the received private key signature;
receiving, from a terminal associated with a public safety entity, an emergency alert over the public network;
generating, based at least in part on the first priority, a first cryptographic signature associated with the emergency alert using a first private key associated with the PKI;
generating, based at least in part on the second priority, a second cryptographic signature associated with the emergency alert using a second private key associated with the PKI; and
broadcasting the emergency alert and the second cryptographic signature over at least the NPN to the electronic device; and
the electronic device configured to perform operations comprising:
receiving the first public key associated with the PKI when the electronic device enters the geographic location associated with the public network;
receiving the second public key associated with the second PKI when the electronic device enters the geographic location associated with the NPN receiving, via the NPN, the emergency alert including the second cryptographic signature;
generating a second public key signature via the second public key and comparing the second public key signature to the second cryptographic signature; and
causing, in response to:
the second public key signature matching the second cryptographic signature, the emergency alert to be presented via a display on the electronic device; or the second public key signature not matching the second cryptographic signature, the display to refrain from presenting the emergency alert.

14. The system of claim 13, wherein the emergency alert comprises a wireless emergency alert (WEA) associated with a public warning service (PWS) as defined by 3rd Generation Partnership Project (3GPP).

15. The system of claim 14, wherein the one or more servers are associated with the NPN.

\* \* \* \* \*